United States Patent
Shi et al.

(10) Patent No.: US 7,790,077 B2
(45) Date of Patent: Sep. 7, 2010

(54) PRESSURIZED TOOLING FOR INJECTION MOLDING AND METHOD OF USING

(75) Inventors: Yu Shi, Branchburg, NJ (US); Chantel Walters, Toledo, OH (US); L. Robert Deardurff, Waterville, OH (US); Mikell Schultheis, Acworth, GA (US); Robert Kriegel, Decatur, GA (US); Christopher W. White, Toledo, OH (US)

(73) Assignee: The Coca-Cola Company, Atlanta, GA (US)

( * ) Notice: Subject to any disclaimer, the term of this patent is extended or adjusted under 35 U.S.C. 154(b) by 350 days.

(21) Appl. No.: 11/850,450

(22) Filed: Sep. 5, 2007

(65) Prior Publication Data

US 2008/0067710 A1    Mar. 20, 2008

Related U.S. Application Data

(60) Provisional application No. 60/825,844, filed on Sep. 15, 2006.

(51) Int. Cl.
*B29C 45/00* (2006.01)

(52) U.S. Cl. ............... 264/85; 264/328.1; 264/500; 425/533; 425/546

(58) Field of Classification Search ............... 264/572, 264/85, 500, 510, 512, 513, 537, 328.1; 425/130, 533, 546
See application file for complete search history.

(56) References Cited

U.S. PATENT DOCUMENTS

| | | | |
|---|---|---|---|
| 3,281,392 A | 10/1966 | Oddo et al. | |
| 4,401,805 A | 8/1983 | Weemes et al. | |
| 4,412,804 A | 11/1983 | Hunter | |
| 4,474,918 A | 10/1984 | Seymour et al. | |
| 4,574,148 A | 3/1986 | Wicker et al. | |
| 4,861,256 A | 8/1989 | Covey | |
| 4,882,410 A | 11/1989 | Neugebauer et al. | |
| 5,011,720 A | 4/1991 | Jabarin | |
| 5,021,515 A | 6/1991 | Cochran et al. | |
| 5,028,462 A | 7/1991 | Matlack et al. | |
| 5,095,001 A | 3/1992 | Miles et al. | |

(Continued)

FOREIGN PATENT DOCUMENTS

EP    0395237    10/1990

(Continued)

OTHER PUBLICATIONS

Robeson & Faucher, J. Polymer Science, Part B 7, 35-40 (1969).

(Continued)

*Primary Examiner*—Jill L Heitbrink
(74) *Attorney, Agent, or Firm*—Sutherland Asbill & Brennan LLP

(57) ABSTRACT

The present invention relates to an apparatus and process for injection molding polymer articles that reduces deposition of additives on the apparatus. Specifically, pressurizing of the mold cavity with a pressurized gas reduces the deposition of low molecular weight additives on the apparatus. Embodiments of the invention also include an apparatus for injection molding polymer articles comprising at least one pressurized gas inlet for introducing a pressurized gas into the mold cavity.

40 Claims, 3 Drawing Sheets

U.S. PATENT DOCUMENTS

| | | | |
|---|---|---|---|
| 5,466,141 | A | 11/1995 | Eckardt et al. |
| 5,473,161 | A | 12/1995 | Nix et al. |
| 5,588,598 | A | 12/1996 | Brewster et al. |
| 5,662,926 | A | 9/1997 | Wick et al. |
| 5,679,373 | A | 10/1997 | Wick et al. |
| 5,700,554 | A | 12/1997 | Speer et al. |
| 5,744,056 | A | 4/1998 | Venkateshwaran et al. |
| 5,837,186 | A | 11/1998 | Gotterbauer |
| 5,898,060 | A | 4/1999 | Suzuki et al. |
| 5,914,138 | A | 6/1999 | Swenson |
| 5,952,066 | A | 9/1999 | Schmidt et al. |
| 6,010,715 | A | 1/2000 | Wick et al. |
| 6,146,577 | A * | 11/2000 | Yamaki et al. .............. 264/500 |
| 6,150,450 | A | 11/2000 | Sekiyama et al. |
| 6,150,454 | A | 11/2000 | Wu et al. |
| 6,320,014 | B1 | 11/2001 | Takahashi et al. |
| 6,465,109 | B2 | 10/2002 | Ohtsuka |
| 6,596,213 | B2 | 7/2003 | Swenson |
| 6,680,093 | B1 | 1/2004 | Ries et al. |
| 6,720,052 | B1 | 4/2004 | Rule et al. |
| 6,740,378 | B1 | 5/2004 | Rule et al. |
| 6,749,785 | B2 | 6/2004 | Subramanian et al. |
| 6,756,013 | B1 | 6/2004 | Cornell et al. |
| 6,808,753 | B2 | 10/2004 | Rule et al. |
| 6,811,826 | B2 | 11/2004 | Rule et al. |
| 6,929,836 | B2 | 8/2005 | Kikuchi et al. |
| 6,982,119 | B2 | 1/2006 | Shi |
| 2002/0032259 | A1 | 3/2002 | Harvey et al. |
| 2002/0198331 | A1 | 12/2002 | Nishihara et al. |
| 2003/0094723 | A1 | 5/2003 | Ruppman, Sr. |
| 2003/0178737 | A1 | 9/2003 | Tseng et al. |
| 2003/0194517 | A1 | 10/2003 | Shi |
| 2003/0194563 | A1 | 10/2003 | Shi |
| 2004/0116619 | A1 | 6/2004 | Moad et al. |
| 2004/0247739 | A1 | 12/2004 | Sabin et al. |
| 2005/0082707 | A1 | 4/2005 | Sabin et al. |
| 2005/0100696 | A1 | 5/2005 | Shi |
| 2005/0118371 | A1 | 6/2005 | Shi |
| 2005/0153084 | A1 | 7/2005 | Shi |
| 2005/0196500 | A1 | 9/2005 | Shi |
| 2005/0205492 | A1 | 9/2005 | Yusa et al. |
| 2005/0221036 | A1 | 10/2005 | Shi |
| 2005/0260371 | A1 | 11/2005 | Shi et al. |
| 2005/0279707 | A1 | 12/2005 | Matthews et al. |
| 2005/0281969 | A1 | 12/2005 | Shi et al. |
| 2006/0246242 | A1 | 11/2006 | Siegel et al. |
| 2006/0257602 | A1 | 11/2006 | Shi |
| 2006/0257603 | A1 | 11/2006 | Shi et al. |
| 2006/0275568 | A1 | 12/2006 | Shi et al. |
| 2007/0014953 | A1 | 1/2007 | Siegel et al. |
| 2007/0082156 | A1 | 4/2007 | Shi et al. |
| 2008/0113134 | A1 | 5/2008 | Shi et al. |

FOREIGN PATENT DOCUMENTS

| | | |
|---|---|---|
| EP | 0604980 | 7/1994 |
| EP | 0678554 | 10/1995 |
| EP | 0914919 | 5/1999 |
| EP | 1179405 | 2/2002 |
| EP | 1219400 | 7/2002 |
| GB | 1434828 | 5/1976 |
| JP | 61195155 | 8/1986 |
| JP | 5339357 | 12/1993 |
| JP | 2000212302 | 2/2000 |
| WO | 94/26622 | 11/1994 |
| WO | 98/36023 | 8/1998 |
| WO | 01/12521 | 2/2001 |
| WO | 02/13612 | 2/2002 |
| WO | 2004/041496 | 5/2004 |
| WO | 2004/113414 | 12/2004 |
| WO | 2005/014254 | 2/2005 |
| WO | 2008/033767 | 3/2008 |

OTHER PUBLICATIONS

RD-230029 A, Published Jun. 1983 (Anonymous).

"Nylon-MXD6 (PA-MXD6)," posted at the Mitsubishi Chemical Inc.'s Website.

Maeda, Y., et al., "Effect of Antiplasticization on Gas Sorption and Transport. I. Polysulfone," Journal of Polymer Science: Part B: Polymer Physics, vol. 25, 957-980 (1987).

Maeda, Y., et al., "Effect of Antiplasticization on Gas Sorption and Transport. II. Polysulfone," Journal of Polymer Science: Part B: Polymer Physics, vol. 25, 981-1003 (1987).

Maeda, Y., et al., "Effect of Antiplasticization on Gas Sorption and Transport. III. Polysulfone," Journal of Polymer Science: Part B: Polymer Physics, vol. 25, 1005-1016 (1987).

Maxwelli, et al., "Secondary relaxation processes in polyethylene terephthalate-additive blends: 2. Dynamic mechanical and dielectric investigations," Polymer, vol. 39, No. 26, 6851-6859 (1998).

Van Krevelen, D.W., "Properties of Polymers: Their Correlation with Chemical Structure; Their Numerical Estimation and Prediction from Additive Group Contributions," Elsevier Science B.V., Third Completely Revised Revision (1997).

Notice of Allowance mailed on Nov. 17, 2009 for U.S. Appl. No. 11/532,361.

Final Rejection mailed on Apr. 26, 2010 for U.S. Appl. No. 11/850,575.

International Search Report and Written Opinion mailed on Feb. 7, 2008 for PCT/US2007/078030.

International Preliminary Report on Patentability mailed on Aug. 8, 2008 for PCT/US2007/078030.

L.M. Robeson & J.A. Faucher, J. Polymer Science, Part B 7, 35-40 (1969).

\* cited by examiner

PRESSURIZED TOOLING FOR INJECTION MOLDING AND METHOD OF USING

CROSS-REFERENCE TO RELATED APPLICATIONS

The present application claims priority under 35 U.S.C. §119(e) to U.S. Provisional Application No. 60/825,844, entitled "Pressurized Tooling for Injection Molding and Method of Using," filed on Sep. 15, 2006, which is hereby incorporated by reference in its entirety.

FIELD OF THE INVENTION

This invention relates generally to an apparatus and process for the injection molding of polymer materials for reducing mold plate-out. More particularly, this invention relates to an apparatus and process for pressurizing a mold cavity in a mold of an injection molding apparatus with pressurized gas.

BACKGROUND OF THE INVENTION

Polyethylene terepthalate and its copolyesters (hereinafter referred to collectively as "PET") are widely used for making containers for various packaged beverages, including carbonated beverages, juice, and water. Although PET has an excellent combination of clarity, mechanical, and gas barrier properties, use of PET for small packages of carbonated beverages and oxygen sensitive products is limited by PET's insufficient gas barrier properties to oxygen and carbon dioxide. Thus, there is a widespread need for a PET composition having improved gas barrier properties.

The packaging of carbonated beverages in small packages is limited by the high permeation rate of carbon dioxide through PET. Typically, packages have a permeation rate in the range of 3 to 14 cc/day, or a 1.5 to 2 percent loss per week, depending on the size of the package. The small package size has a larger surface-to-volume ratio than standard package sizes, resulting in a higher relative rate of loss. Therefore, PET containers primarily are used for large packaging of carbonated beverages, while metal cans and glass bottles are used for small packaging of carbonated beverages.

The amount of carbon dioxide remaining in a packaged carbonated soft drink determines its shelf life. Normally, carbonated soft drink containers are filled with approximately four volumes of carbon dioxide per volume of water. It is generally accepted that a packaged carbonated soft drink reaches the end of its shelf life when 17.5 percent of the carbon dioxide in the container is lost due to permeation of the carbon dioxide through the container side wall and closure. The permeability of PET to carbon dioxide therefore determines the shelf life of the packaged carbonated beverage and thus, the suitability of PET as a packaging material.

Numerous technologies have been developed or are being developed to enhance the barrier of PET to small gas molecules. For example, external or internal coatings for enhancing the gas barrier of PET containers have been developed. The coating layer is normally a very high barrier layer, either inorganic or organic, and slows down the diffusion of gases. Implementation of this technology, however, requires coating equipment not normally utilized in the manufacture of packaged beverages and therefore requires substantial capital investment, increased energy usage, and increased floor space. In many beverage packaging plants that are already crowded, the additional space is not an option.

Multi-layered containers also have been developed with a high barrier layer sandwiched between two or more PET layers. Implementation of this technology also requires substantial capital investment and delamination of the container layers impacts appearance, barrier, and mechanical performance of the containers.

A barrier additive for the PET or a polymer with inherent barrier properties would be preferred solutions. Neither such solution requires additional capital investment, and therefore, does not have the limitations inherent with other technologies. A barrier additive also can be added during the injection molding process which gives more flexibility for downstream operations.

L. M. Robeson and J. A. Faucher disclose in J. Polymer Science, Part B 7, 35-40 (1969) that certain additives can be incorporated into polymers to increase their modulus and gas barrier properties through an antiplasticization mechanism. This article discloses utilizing additives with polycarbonate, polyvinyl chloride, polyphenylene oxide, and polyethylene oxide.

In WO 01/12521, Plotzker et al. propose the use of additives selected from 4-hydroxybenzoates and related molecules to increase the gas barrier properties of PET. This published patent application discloses barrier additives of the following structures:

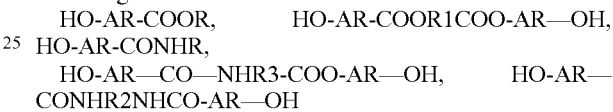

In the foregoing structure, AR is selected from substituted or unsubstituted phenylene or naphthalene and R1, R2, and R3 are selected from the group consisting of a C1 to C6 alkyl group, a phenyl group, and a naphthyl group.

The foregoing additives described in the art provide only moderate improvement in PET barrier, less than 2.1 times (X) for oxygen barrier for the best examples with a 5 weight percent loading level. At this loading level, however, PET experiences substantial degradation and a significant drop in intrinsic viscosity (IV). Although lowering the level of additive reduces the degradation of PET, it also reduces the barrier improvement factor, so much so that no real benefit exists in using these additives in packaging carbonated soft drinks or oxygen sensitive food. Part of the IV loss is due to the addition of the small molecular additive. Additional IV loss results when additives contain functional groups capable of reacting with PET and causing the break down of the molecular weight. Additives with reactive functional groups usually are more soluble in PET and thus do not impart haziness in the bottle. PET with a significantly lower IV cannot be used in blow molding containers, such as beverage containers. Furthermore, lower IV PET makes containers with poor mechanical performance, such as creep, drop impact, and the like. Still further, PET containers made from lower IV PET have poor stress cracking resistance, which is undesirable in container applications.

PET also has been modified or blended with other components to enhance the gas barrier of the PET. Examples include polyethylene naphthalate (PEN)/PET copolymers or blends, isophthalate (IPA) modified PET, PET blended with polyethylene isophthalate (PEI) or a polyamide, such as nylon, and PET modified with resorcinol based diols. For a PET copolymer to achieve moderate barrier enhancement of 2× or higher, the modification is normally more than 10 to 20 weight or mole percent of the total co-monomers. When PET is modified to such a high level, the stretching characteristics of the PET are changed dramatically such that the normal PET container preform design could not be used in the manufacture of containers. Using these PET copolymers to mold conventional PET container preforms results in preforms that can not be fully stretched and the ultimate containers are very difficult, if not impossible, to make. Even if such a container can be made, it does not show improved barrier performance and shows deteriorated physical performance such that it can not be used to package carbonated soft drinks. Furthermore, PET blends with polyamides, such as nylon, developed yellowness and haze and are not clear like conventional PET.

U.S. Pat. Nos. 5,888,598 and 6,150,450 disclose redesigned PET container preforms with thicker side walls to compensate for the increased stretch ratio. This thicker preform, however, requires new molds which require additional capital investment. The thicker preform also is made at a lower rate of productivity because it takes longer to cool and reheat the thicker wall perform during the blow molding process.

More recently, it has been discovered that low molecular weight compounds may provide the needed improvements to the gas barrier properties of PET. There is a significant problem with plate-out, however, for conventional injection molding of polymers having high melting and processing temperatures, such as PET, with low molecular weight additives. Plate-out occurs where there is deposition of material (e.g., polymer extracts, lubricants, stabilizers, or plasticizers) onto the surfaces of an injection molding apparatus during the processing of polymers. Plate-out reduces the running time of the injection molding apparatus, resulting in costly production delays for cleaning. Accordingly, there exists a need for an improved process and apparatus for injection molding polymers that reduces plate-out.

SUMMARY OF THE INVENTION

This invention addresses the above described needs by providing a process and apparatus for injection molding polymer materials with reduced plate-out.

In one embodiment, a process for injection molding polymer articles comprises the steps of pressurizing a mold cavity of a mold in an injection molding apparatus by introducing a pressurized gas into the mold cavity, wherein the mold cavity defines the shape of a polymer article, introducing a polymer material into the mold cavity, cooling the polymer material to form the polymer article, and removing the polymer article from the mold cavity. In a particular embodiment, the mold comprises a plurality of mold cavities for forming a plurality of polymer articles.

In another embodiment, the polymer material comprises a polymer matrix and a low molecular weight additive. In a particular embodiment, the polymer matrix comprises PET and the low molecular weight additive comprises a purine derivative (e.g., a purine dione such as caffeine, theophylline, theobromine, or mixtures thereof).

In yet another embodiment, the pressurized gas comprises any non-reactive gases, particularly air, oxygen, nitrogen, carbon dioxide, argon, neon, helium, xenon, or mixtures thereof. The mold cavity also may be pressurized through the vaporization of a liquid, such as water, alcohol, or any non-reactive, non-plating volatile organic compounds which are capable of forming pressure in the mold cavity in situ during the injection molding process.

In still another embodiment, an apparatus for injection molding polymer articles comprises a mold having at least one mold cavity defining the shape of a polymer article, a polymer material inlet for introducing a polymer material into the at least one mold cavity, and at least one pressurized gas inlet for introducing a pressurized gas into the at least one mold cavity.

Other objects, features, and advantages of the invention will be apparent from the following detailed description, drawings, and claims.

DETAILED DESCRIPTION OF THE INVENTION

Figure 2B:
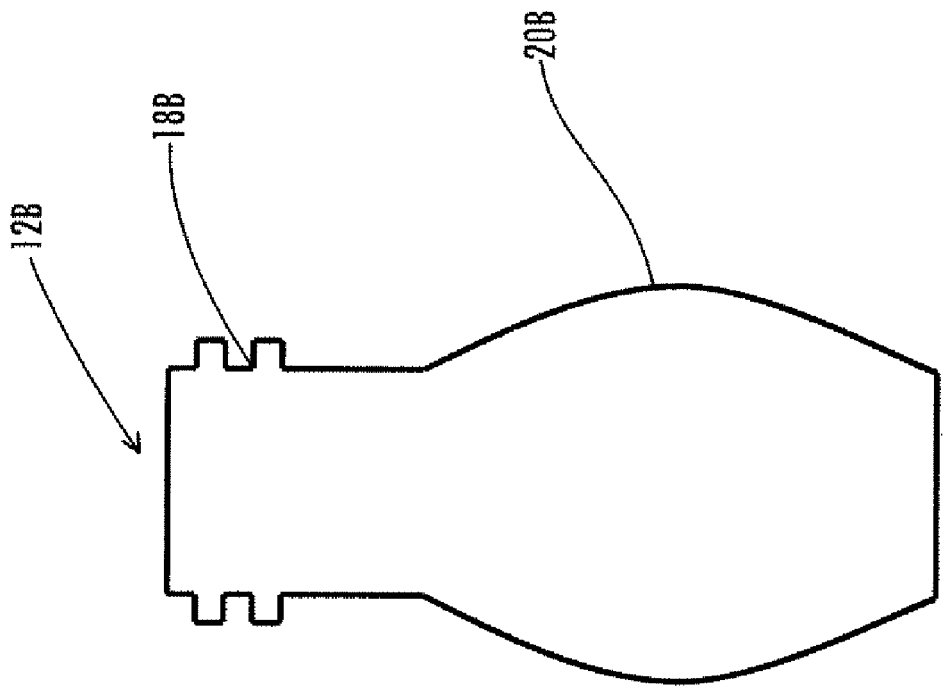
FIGS. 2A and 2B are elevation views of polymer articles according to particular embodiments of the invention.
Figure 2A:
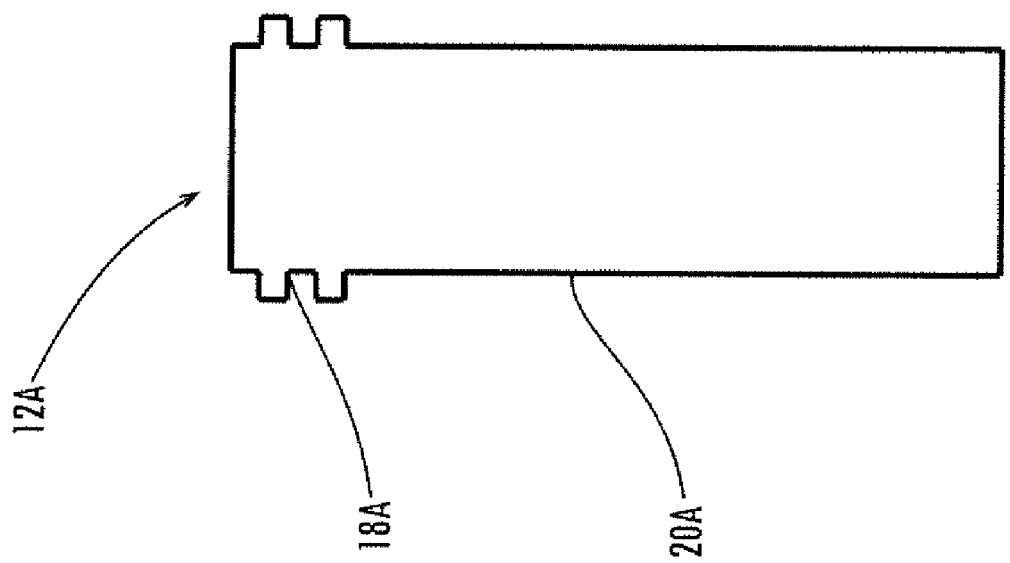
Figure 3:
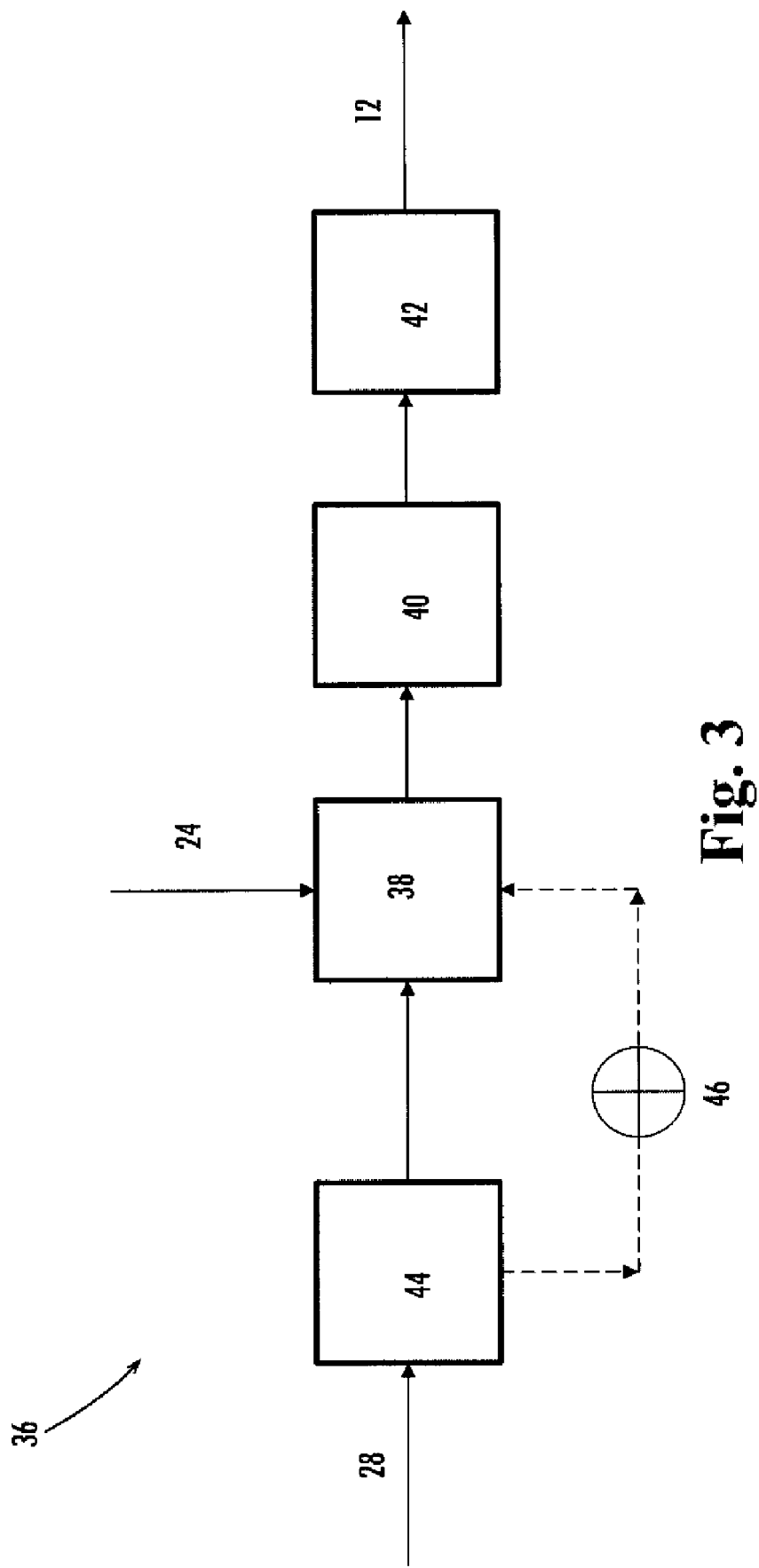
FIG. 3 is a schematic diagram of the process for injection molding polymer articles according to a particular embodiment of the invention.

Injection molding is a technique frequently used for the production of polymer and glass articles. As previously described, conventional injection molding of polymers having high melting and processing temperatures combined with low molecular weight additives results in significant plate-out. Contributing factors to plate-out include the solubility of the low molecular weight compound in the polymer, the volatility of the low molecular weight additive, the transport properties of the polymer, the temperature of the polymer during processing, and the temperature of the molds. These problems are addressed by providing a process and apparatus for injection molding polymer articles that reduces, and in preferred embodiments, minimizes plate-out. Embodiments are described in detail below and are illustrated in FIG. 1-3.

Figure 1:
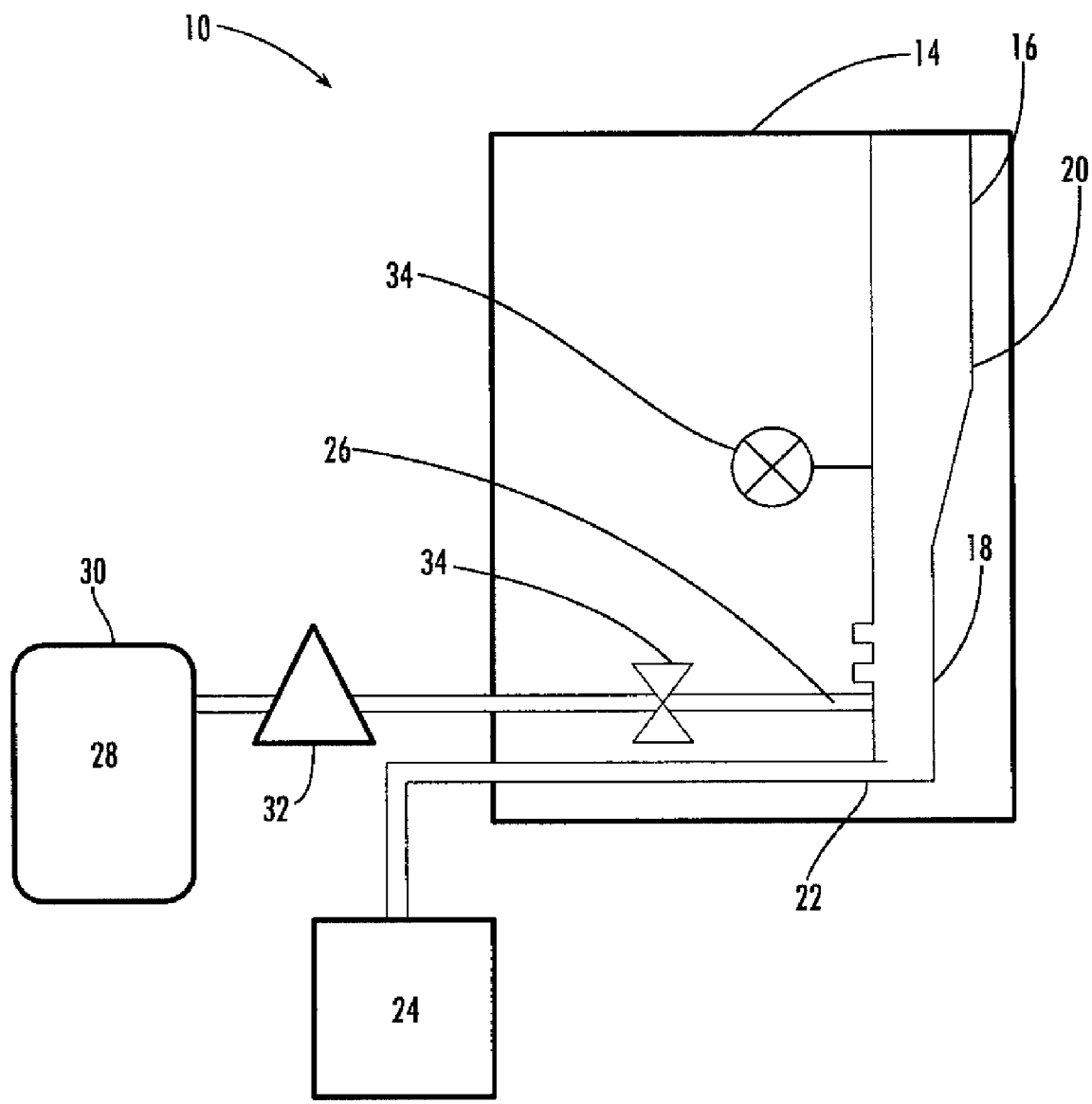
FIG. 1 is a partial schematic diagram of an apparatus for injection molding polymer articles according to a particular embodiment of the invention.

An apparatus 10 for injection molding polymer articles 12, illustrated in FIG. 1, comprises a mold 14 having a mold cavity 16. The mold 14 generally comprises a metal with conventional polished designs on the surfaces of the mold cavity 16. Alternatively, the surfaces of the mold cavity 16 may be textured. The metal should be selected for its thermal conductivity, platings, and resistance to corrosion. Suitable metals are well known to those of ordinary skill in the art.

The mold cavity 16 defines the shape of the polymer articles 12. In one embodiment, the polymer articles 12A comprise container preforms that later are blow molded into hollow containers (FIG. 2A). In another embodiment, the polymer articles 12B comprise hollow containers (FIG. 2B). In either embodiment, the shape of the polymer article 12 (A,B) is comprised of a neck-ring area 18 (A,B) and a body area 20 (A,B). Accordingly, the mold cavity 16 has a corresponding neck-ring area 18 and body area 20. A plurality of polymer articles 12 may be produced using the mold 14 by having a plurality of mold cavities 16 in the mold 14. In one embodiment, the mold 14 comprises between one and 192 mold cavities 16.

The mold 14 (FIG. 1) further comprises a polymer material inlet 22, for introducing the polymer material 24 by injection into the mold cavity 16, and a pressurized gas inlet 26, for introducing a pressurized gas 28 from a source 30 of pressurized gas into the mold cavity 16. The mold 14 may comprise a plurality of polymer material inlets 22 and pressurized gas inlets 26 into the mold cavity 16. Additionally, the polymer material inlet 22 and pressurized gas inlet 26 may be gated or valved to control the flow through the inlet. In one embodiment, the pressurized gas inlet 26 comprises an injector such as a gas injection nozzle.

In one embodiment, the pressurized gas inlet 26 is located in the neck-ring area 18 of the mold cavity 16. Alternatively, the pressurized gas inlet 26 is located in the body area 20 of the mold cavity 16. There may be a plurality of pressurized gas inlets 26 in the neck-ring area 18, body area 20, or any combination of the neck-ring and body areas. In a particular embodiment (not shown), the polymer material inlet 22 and pressurized gas inlet 26 are the same. In another particular embodiment, the polymer material inlet 22 and pressurized gas inlet 26 are different.

In one embodiment, the pressurized gas inlet 26 also functions as a vent. In another particular embodiment, the mold 14 may further comprise a vent (not shown) that is different than the pressurized gas inlet 26.

In a particular embodiment, the source 30 of a pressurized gas 28 comprises a high pressure gas reservoir for storing the pressurized gas 28. In another embodiment, the apparatus 10 further comprises a high pressure gas pump 32 for moving the pressurized gas 28 from the high pressure gas reservoir 30 through the pressurized gas inlet 26 into the mold cavity 16. In still another embodiment, the apparatus 10 further comprises a means 34 for measuring and controlling the pressure in the mold cavity 16. Such means 34 for measuring and controlling pressure are well known in the art. In a particular embodiment, the means 34 for measuring and controlling pressure comprises a pressure gauge or valve. When the apparatus 10 comprises a means 34 for measuring and controlling pressure, the flow of pressurized gas 28 into the mold cavity 16 can be controlled to maintain the pressure in the range from about 1 to about 1000 psig, from about 2 to about 750 psig, or from about 3 to about 500 psig.

In a particular embodiment, a means 34 for measuring and controlling pressure permits manipulation of the pressure profile being applied to the advancing melt front as the mold cavity 16 fills with the pressurized gas 28. In another particular embodiment wherein the apparatus 10 comprises a plurality of mold cavities 16, the means 34 for measuring and controlling pressure permits control of the pressure in the individual mold cavities 16 to compensate for variations in the melt delivery system.

The pressurized gas 28 may comprise any gas that does not detrimentally affect the polymer material 24 of the polymer article 12. In an embodiment, the pressurized gas 28 is a gas at room temperature. In a particular embodiment, the pressurized gas 28 comprises any non-reactive gases, non-limiting examples of which include air or any of its components, including oxygen, nitrogen, carbon dioxide, and mixtures thereof. In another particular embodiment, the pressurized gas 28 comprises any of the noble gases, including argon, neon, helium, xenon, and mixtures thereof.

The pressurized gas 28 also may be supplied to the mold cavity 16 by an alternate means (i.e., not requiring a pressurized gas reservoir 30 or pressurized gas pump 32). For example, the mold cavity 16 may be pressurized by the vaporization of a liquid to form a pressurized gas in the mold cavity in situ during the injection molding process. In such instances, the liquid present in the mold cavity would evaporate when exposed to the heat of the polymer melt front, creating a cushion of gas against the advancing melt front as the liquid is displaced by the gas. Non-limiting examples of such liquids include water, alcohol, or any non-reactive, non-plating volatile organic compounds capable of pressurizing the mold cavity in situ during the injection molding process. In another particular embodiment, the mold cavity 16 may be pressurized by a liquid which does not interact with the injection process. For example, the mold cavity 16 could be filled with a liquid followed by application of a hydrostatic pressure.

Another example of alternate means by which the pressurized gas 28 may be supplied to the mold cavity 16 is through a chemical reaction that generates a pressurized gas 28. In a particular embodiment, a foaming agent is introduced into the mold cavity 16 to produce the pressurized gas 28. In another embodiment, the pressurized gas 28 may be premixed into the polymer material 24, wherein the pressurized gas 28 diffuses through the polymer material to pressurize the mold cavity 16 during the injection molding process, thereby reducing plate-out. In still another embodiment, the pressurized gas 28 may be introduced into the mold cavity 16 at the same time as the polymer material 24.

The mold 14 may further comprise a means for measuring and controlling the tooling temperature (not shown). For example, a means for measuring and controlling the tooling temperature could maintain the mold temperature at a warmer temperature, thereby reducing the tendency to plate-out; the tooling temperature could be varied across the mold 14 by elevating the mold temperature at locations in proximity to where plate-out occurs while maintaining optimal molding temperatures throughout the remainder of the mold; or temperature heating and cooling strategies could be developed which allow for the tooling to run at elevated temperatures during filling but rapidly cool during the cooling portion of the injection cycle.

In another particular embodiment, the apparatus 10 comprises a means for reducing the melt temperature (not shown), thereby reducing plate-out. For example, vibrating a melt has been shown to lower the melt temperature. Alternatively, the valve gate, where there is rapid heating of the melt, may be modified to reduce the melt temperature.

The polymer material 24 comprises a polymer matrix and a low molecular weight additive. The polymer matrix may comprise any polymer with a melting or processing temperature in excess of 100° C. Non-limiting examples include polyesters, polyamides, polyolefins, polylactides, and polyimides. In a particular embodiment, the polymer matrix comprises the thermoplastic polymer polyethylene terephthalate (PET). The low molecular weight additive may comprise any organic or inorganic material with a molecular weight below about 2000 daltons, below about 1500 daltons, or below about 1000 daltons. In a particular embodiment, the low molecular weight additive comprises a purine derivative, as disclosed in the co-pending non-provisional patent application Ser. No. 11/532,361 filed on Sep. 15, 2006, entitled "Container and Composition for Enhanced Gas Barrier Properties," which claims priority to the provisional patent application 60/723,751 filed on Oct. 15, 2005, by inventor's Yu Shi, et al. These patent applications are hereby incorporated by reference in their entirety. Non-limiting examples of purine derivatives include caffeine, theophylline, and theobromine.

Optionally, the polymer container may comprise a plurality of layers as described in co-pending patent application No. 60/825,861 filed on Sep. 15, 2006, entitled "Multilayer Container For Enhanced Gas Barrier Properties," the disclosure of which is expressly incorporated herein by reference in its entirety. A multilayer container can permit the use of additives in a barrier layer that normally would be too volatile for inclusion in a single layer container because the low molecular weight additive is contained between two outer layers without the low molecular weight additive, preventing contact between the low molecular weight additive and the surfaces of the injection molding apparatus. Accordingly, a multilayer container would further reduce the occurrence of plate-out during the injection molding process.

Briefly described, a multilayer container comprises at least two outer layers comprising a polymer matrix and at least one barrier layer disposed between the at least two outer layers. The at least one barrier layer comprises a polyester composition comprising a polyester and an enhanced gas barrier additive comprising a purine derivative. Desirably, the low molecular weight additive is present in the multilayer container in an amount in the range of about 0.2 to about 10 weight percent of the container, the at least two outer layers comprise about 99 to about 20 weight percent of the container, and the one or more barrier layers comprise about 1 to about 80 weight percent of the container. In another particular embodiment, the multilayer container further comprises at least one intermediate layer between the at least one barrier layer and the at least two outer layers. Equipment and methods for making such multilayer containers are well known to those of ordinary skill in the art. For example, the plurality of layers could be co-extruded using a modified configuration of the pressurized injection molding apparatus described herein.

The present invention also encompasses a process for the injection molding of polymer articles 12. As previously discussed, an individual or a plurality of polymer articles 12 may be made by varying the number of mold cavities 16 in the mold 14 of the apparatus 10. In the discussion herein, references to an individual mold cavity 16 also shall encompass molds 14 comprising a plurality of mold cavities 16.

Typically, the process of injection molding 36 (FIG. 3) comprises the steps of introducing 38 a polymer material 24 into the mold cavity 16, cooling 40 the polymer material 24, and removing 42 the polymer article 12 from the mold cavity 16. The injection molding process 36 embodied herein further comprises the step of pressurizing 44 the mold cavity 16 by introducing a pressurized gas 28 into the mold cavity 16 before, or at the same time as, the step of introducing 38 a polymer material 24 into the mold cavity 16. The pressurized gas 28 may be introduced into the mold cavity 16 through an individual or a plurality of pressurized gas inlets 26. Alternatively, the pressurized gas 28 may be introduced into the mold cavity 16 by reacting materials together to produce the pressurized gas 28; by premixing the pressurized gas 28 into the polymer material 24 such that it diffuses through the polymer material; by co-injecting the pressurized gas 28 and polymer material 24 into the mold cavity 16; by introducing a foaming agent into the mold cavity 16; or by introducing a volatile compound into the mold cavity 16.

In another embodiment, the process 36 further comprises measuring and controlling 46 the pressure of the mold cavity 16. Specifically, the flow of the pressurized gas 28 into the mold cavity 16 is controlled such that the pressure of the mold cavity 16 is maintained in the range from about 1 to about 1000 psig. In still another embodiment, the process is carried out at an operating temperature in the range of about 0 to about 350° C.

The additional step of pressurizing 44 the mold cavity 16 changes the dynamics of the processing cycle by reducing or completely eliminating the ability of additives, such as low molecular weight additives, to diffuse through the polymer material 24 and deposit on the inner surfaces of the mold 14. The desired pressure of the mold cavity 16 can be optimized for a particular polymer material 24, polymer matrix, or additive.

Not wishing to be bound by any theory, it is believed that the hydrostatic pressure applied to the melt holds the additive in solution in the liquid media. As the melt is allowed to depressurize when entering a mold cavity at ambient pressure conditions, the dissolved additive sublimes from the surface of the advancing melt front, resulting in deposition of the material on the tooling and functional vents. By applying pressure to a portion of the mold during the filling time, the level of deposits are reduced significantly. It is believed that designs allowing for the application of pressure during the entire filling cycle may eliminate the problems associated with plate-out entirely. Simply immersing the entire mold in a pressurized media or the entire machine in a hyperpressurized environment would prevent the sublimation process to initiate; however, it also is believed that the rapid pressurization and flow of pressurized fluid out of the perform cavity assist in the purging of deposits. Accordingly, the tooling could be purged with water vapor, jets, or combinations thereof to remove water soluble deposits.

The present invention is further illustrated by the following example, which is not to be construed in any way as imposing limitations upon the scope thereof. On the contrary, it is to be clearly understood that resort may be had to various other embodiments, modifications, and equivalents thereof which, after reading the description therein, may suggestion themselves to those skilled in the art without departing from the spirit of the present invention and/or the scope of the appended claims.

COMPARATIVE EXAMPLE

A mixture of a PET resin and the low molecular weight additive caffeine (comprising 3 weight percent of the PET mixture) was introduced into a Husky® injection molding machine. The polymer material was injected into a mold having six mold cavities. Each mold cavity was pressurized to 300 psi with air. The injection molding process proceeded as normal, producing six container preforms at a time. The exposed tooling surfaces of the machine were inspected visually after each ejection cycle. Pressurizing the mold cavities enabled the machine to run approximately 24 to 26 hours before significant plate-out was observed that resulted in a significant loss of product quality.

The same polymer material (PET and 3 weight percent caffeine) also was made without the step of pressurizing the mold cavities. Without pressurizing the mold cavities, the machine only ran approximately one to two hours before significant plate-out was observed that resulted in significant loss of product quality. Thus, pressurizing of the mold cavities allowed for significantly longer processing runs by reducing plate-out.

It should be apparent that the foregoing relates only to particular embodiments of the present invention, and that numerous changes and modifications may be made therein without departing from the scope of the invention as defined by the following claims and equivalents thereof.

We claim:

1. A process for injection molding polymer articles comprising the steps of:
   pressurizing a mold by introducing a pressurized gas into at least one mold cavity in the mold, wherein the at least one mold cavity defines a shape of a polymer article comprising a container preform;
   introducing a polymer material into the at least one mold cavity, wherein the polymer material comprises a polymer matrix and a low molecular weight gas barrier enhancing additive;
   cooling the polymer material; and
   removing at least one of the polymer articles from the at least one mold cavity.

2. The process of claim 1, wherein the polymer matrix comprises a thermoplastic polymer.

3. The process of claim 1, wherein the polymer matrix comprises polyester, polyamide, polyolefin, polyimide, polylactide, or derivatives thereof.

4. The process of claim 1, wherein the polymer matrix comprises polyethylene terephthalate.

5. The process of claim 1, wherein the low molecular weight additive comprises a compound with a molecular weight below about 2000 daltons.

6. The process of claim 1, wherein the low molecular weight additive comprises a compound with a molecular weight below about 1500 daltons.

7. The process of claim 1, wherein the low molecular weight additive comprises a compound with a molecular weight below about 1000 daltons.

8. The process of claim 1, wherein the low molecular weight additive comprises a purine derivative.

9. The process of claim 8, wherein the purine derivative comprises a purine dione.

10. The process of claim 9, wherein the purine dione comprises caffeine, theophylline, theobromine, or mixtures thereof.

11. The process of claim 1, wherein the pressurized gas comprises air, nitrogen, oxygen, carbon dioxide, argon, neon, helium, xenon, or mixtures thereof.

12. The process of claim 1, wherein the container preform shape of the polymer article comprises a neck-ring area and a body area.

13. The process of claim 12, wherein the pressurized gas is introduced into at least one location in the neck-ring area of the at least one mold cavity.

14. The process of claim 12, wherein the pressurized gas is introduced into at least one location in the body area of the at least one mold cavity.

15. The process of claim 12, wherein the pressurized gas is introduced into at least one location in the neck-ring area and at least one location in the body area of the at least one mold cavity.

16. The process of claim 1, wherein the pressurized gas and polymer material are introduced into the at least one mold cavity through the same inlet.

17. The process of claim 1, wherein the pressurized gas and polymer material are introduced into the at least one mold cavity through different inlets.

18. The process of claim 1, wherein the pressurized gas is introduced into the at least one mold cavity by generating a gas from a chemical reaction.

19. The process of claim 1, wherein the pressurized gas is introduced by a gas generating material introduced into the at least one mold cavity.

20. The process of claim 1, wherein the pressurized gas is introduced by vaporization of a liquid capable of generating a pressurized gas, wherein the liquid comprises water, alcohol, or non-reacting and non-plating volatile organic compounds.

21. The process of claim 1, wherein the pressurized gas is introduced into the at least one mold cavity prior to the polymer material.

22. The process of claim 1, wherein the pressurized gas is introduced into the at least one mold cavity at the same time as the polymer material.

23. The process of claim 22, wherein the pressurized gas is premixed with the polymer material.

24. The process of claim 1, further comprising the step of monitoring pressure in the at least one mold cavity.

25. The process of claim 24, wherein the pressure is in the range of about 1 to about 1000 psig.

26. An apparatus for injection molding polymer articles comprising:
a mold having
at least one mold cavity defining a shape of a polymer article comprising a container preform the container preform comprises a neck-ring and a body area;
a polymer material inlet for introducing a polymer material into the at least one mold cavity; and
at least one pressurized gas inlet for introducing a pressurized gas into the at least one mold cavity the at least one pressurized gas inlet is located in the neck-ring area of the at least one mold cavity, wherein the pressurized gas is operable to reduce and/or eliminate plate-out.

27. The apparatus of claim 26, further comprising an injector for introducing the polymer material into the at least one mold cavity through the polymer material inlet.

28. The apparatus of claim 26, wherein the at least one pressurized gas inlet comprises a gas injection nozzle.

29. The apparatus of claim 26, further comprising a high pressure gas reservoir for storing the pressurized gas.

30. The apparatus of claim 26, further comprising a high pressure gas pump for moving the pressurized gas from the high pressure gas reservoir through the at least one pressurized gas inlet into the at least one mold cavity.

31. The apparatus of claim 26, further comprising a pressure gauge for measuring pressure in the at least one mold cavity.

32. The apparatus of claim 26, wherein the at least one pressurized gas inlet is located in the neck-ring area and body area of the at least one mold cavity.

33. The apparatus of claim 26, wherein the polymer material inlet and at least one pressurized gas inlet are the same.

34. The apparatus of claim 26, wherein the polymer material inlet and at least one pressurized gas inlet are different.

35. The apparatus of claim 26, wherein the pressurized gas comprises air, nitrogen, oxygen, carbon dioxide, argon, neon, helium, xenon, or mixtures thereof.

36. A process for injection molding polymer articles comprising the steps of:
pressurizing a mold by introducing a pressurized gas into at least one mold cavity in the mold, wherein the at least one mold cavity defines a shape of a polymer article;
introducing a polymer material into the at least one mold cavity, wherein the polymer material comprises a polymer matrix and a low molecular weight additive comprising a purine derivative;
cooling the polymer material; and
removing at least one of the polymer articles from the at least one mold cavity.

37. The process of claim 36, wherein the purine derivative comprises a purine dione.

38. The process of claim 37, wherein the purine dione comprises caffeine, theophylline, theobromine, or mixtures thereof.

39. A process for injection molding polymer articles comprising the steps of:
pressurizing a mold by introducing a pressurized gas into at least one mold cavity in the mold, wherein the at least one mold cavity defines a shape of a polymer article and comprises a neck-ring area and a body area, wherein the pressurized gas is introduced into at least one location in the neck-ring area of the at least one mold cavity;
introducing a polymer material into the at least one mold cavity;
cooling the polymer material; and
removing at least one of the polymer articles from the at least one mold cavity.

40. The process of claim 39, wherein the pressurized gas is introduced into at least one location in the neck-ring area and at least one location in the body area of the at least one mold cavity.

* * * * *